United States Patent [19]

Rice

[11] 4,032,979

[45] June 28, 1977

[54] METHOD AND SYSTEM FOR ENCODING AND DECODING DIGITAL DATA

[75] Inventor: Stephen E. Rice, Del Mar, Calif.

[73] Assignee: Digital Development Corporation, San Diego, Calif.

[22] Filed: Dec. 27, 1974

[21] Appl. No.: 537,121

Related U.S. Application Data

[63] Continuation of Ser. No. 318,587, Dec. 26, 1972, abandoned.

[52] U.S. Cl. .......................... 360/40; 340/347 DD
[51] Int. Cl.² ......................................... G11B 5/09
[58] Field of Search .......... 340/347 DD; 360/39–44

[56] References Cited

UNITED STATES PATENTS

| | | | |
|---|---|---|---|
| 2,807,004 | 9/1957 | Pouliart et al. | 340/172.5 |
| 3,108,261 | 10/1963 | Miller | 360/44 |
| 3,235,855 | 2/1966 | Woo | 360/43 |
| 3,414,894 | 12/1968 | Jacoby | 360/40 |
| 3,508,228 | 4/1970 | Bishop | 360/44 |
| 3,631,428 | 12/1971 | King | 360/40 |
| 3,641,525 | 2/1972 | Milligan | 360/40 |
| 3,679,977 | 7/1972 | Howson | 325/38 A |
| 3,753,255 | 8/1973 | DiVeto | 360/2 |
| 3,760,277 | 9/1973 | Whang | 325/38 A |

Primary Examiner—Thomas J. Sloyan
Attorney, Agent, or Firm—Ralf H. Siegemund

[57] ABSTRACT

A digital data encoding and decoding method and system is disclosed, with particular reference to magnetic records, in which bits are encoded in groups. Three out of four, two-bit combinations are encoded respectively by three patterns of transition placements under the rule that the two-bit group frame be divisible in only three sections having width of the read resolution R and the minimum spacing M between transitions is twice that value. The fourth bit combination is encoded under utilization of altogether four bits, using pattern combinations that extend over six sections R under the same constraint as to minimum spacing. Under otherwise similar conditions, the package density can be increased by 33% as compared with tri-period codes, and more than doubled as compared with frequency doubling or Manchester. The encoding scheme is generalized in that the selective extension of the encoding field for bit groups permits pattern encoding by a smaller number of permissible pattern combinations than seemingly necessary on basis of fixed bit group lengths.

20 Claims, 10 Drawing Figures

Fig. 1b (Jacoby)

Fig. 1c (Miller)

Fig. 1d (Bishop)

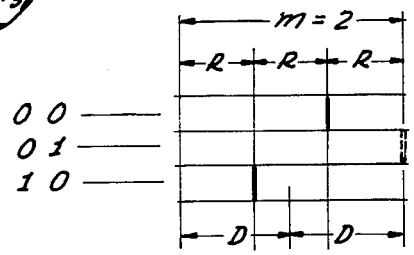
Fig. 2a
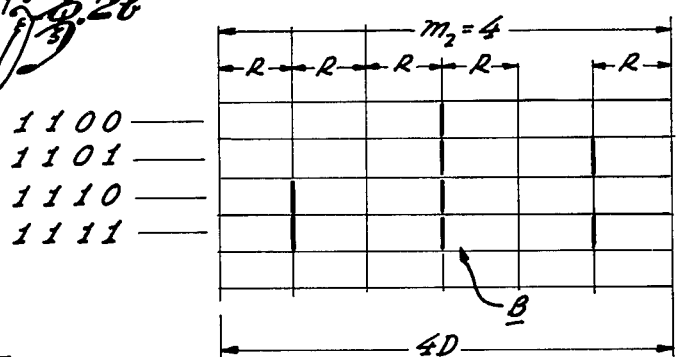
Fig. 2b
Fig. 2c
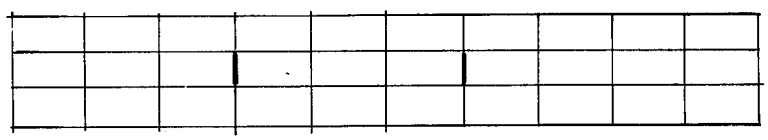
010101
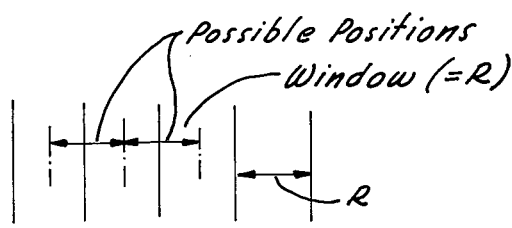
Fig. 2d

METHOD AND SYSTEM FOR ENCODING AND DECODING DIGITAL DATA

This is a continuation, of application Ser. No. 318,587, filed Dec. 26, 1972 abandoned.

BACKGROUND OF THE INVENTION

The present invention relates to a method and implementing system for storing digital data. While the invention will be developed in relation to storage on and retrieval from magnetic surfaces, the underlying principles have broader application. However, presently the invention will find preferred utility in the field of magnetic disk storage.

Rotating, high-speed disks are very important memory extensions for digital data processing systems, as they permit storage of large quantities of data at relatively low cost. The successful employment of disk storage systems depends to a considerable extent on high data package densities that can be achieved. The limit in package densities is primarily determined by the limitations posed by the magnetic transducer-disk surface interaction.

The transducers must provide magnetic flux and flux reversals to the surface and must respond to the reversals upon retrieval. The spacing of these flux reversals on a data storage track is of digital significance and the retrieval process must distinguish among sequential reversals as to the relative time of occurrence of read back signal peaks which represent the passage of flux reversal on a disk under a pick up or read transducer. These interaction processes establish operational limitations in that flux reversals, sometimes also called transitions, when too closely spaced are no longer recognizable and are nonretrievable as to their information significance; the read back signal peaks are no longer distinguishable from noise and readily merge. Additionally, the difference in spacing of these transitions on a data track are of immediate information significance, but if some transitions are placed too close, they appear shifted upon retrieval (peak displacement), and that, in turn, tends to eradicate the informative differences in read back peak spacing. Upon retrieval of data, "windows" are generated and it is determined whether a read back signal peak does or does not fall in a particular window. The width of that window determines the resolution of the entire record/retrieval process.

Among the most commonly used data encoding techniques are those which store bivalued bits as data on a track under utilization of two different transition spacings and, therefore, of two different recording frequencies, whereby the larger spacing (smaller frequency) determined also the bit rate, and the smaller spacing (higher frequency) was usually chosen to be half the larger spacing. These codes are known under various names: Gabor, Manchester, Frequency Doubling, Phase Shift, etc. They have in common that a bit cell or bit frame had to be twice as long as the minimum distance between the flux reversals that was permissible. To state it differently, these codes used one transition per bit, frame or cell to distinguish and to separate bit cells or frames, and additional transitions were used to distinguish among bit values.

The read resolution of these known methods, i.e. the width of the window generated to detect absence or presence of a peak was, thus, equal to the smallest signal peak separation as it occurs on readback which separation, in time, was thus half of the data rate period. If that smallest peak separation as actually used is close to the minimum separation and spacing possible, or permissible, data package density is at its maximum for such a system. Any increase in package density required a change in encoding techniques (or a change in components). It should be mentioned also that it was inherent in these codes (usually developed for magnetic tapes) that they have self-clocking; a feature deemed desirable for tapes, but no longer significant for disks.

In order to increase the package density of data, other codes have been developed as to implementation in the recent past, some of which go back to a code format developed by Pouliard and others (U.S. Pat. No. 2,807,004). These codes require that at the most there be one transition per bit cell and frame, and at least one per two bit cells. The encoding required that transitions may follow at times at a spacing equal to one and one-half frame or bit cell length. Codes of that type are shown and implemented, for example, in U.S. Pat. Nos. 3,108,261; 3,235,855; 3,414,894; 3,631,428. There appears to be no common name for these codes, but the term tri-period code seems to be appropriate as, e.g., the decoder has to distinguish among three different peak and transition spacings that may occur.

The increase in package density obtainable with these codes is significant; from standpoint of minimum permissible, spatial separation of flux reversals, the data density is doubled by these tri-period codes. The read resolution (in time) is always the minimum period of time by which readback signal peaks may differ as to occurrence. That period is still equal to half a bit frame time for these tri-period codes. Since the bit frame period in the tri-period code is one half the bit frame period in Manchester and frequency doubling, the read resolution is also one half the value it was in these earlier codes. Allowing again the smallest spacing of flux reversals to approach the minimum permissible distance, the frame width is reduced to that value in the tri-period code, but the read resolution is half that value. As a consequence, the so-called peak shift phenomenon becomes more noticeable on read back. Further increase in package density, thus, requires still further codes. The same requirement is true of the read resolution which is to be made larger without decreasing package density.

In accordance with other approaches, it has been suggested to encode bit groups by patterns unique to the group, but individual bit values within the group are no longer identifyable except within and as part of the group (U.S. Pat. No. 3,508,228). This method has the drawback that for a minimum bit spacing as large as a data bit frame, the boundaries between data bit group cells will never hold a transition (or a particular position relative to the bit frame boundaries of the data track) which constraint must be considered wasteful to some extent as far as recording space is concerned.

It should be noted that the term "boundaries" has somewhat arbitrary connotation as it relates occurrence of data bits for recording, local clock or clock track and data track. Please note that in U.S. Pat. No. 3,508,228 the entire pattern could be phase-shifted by ± read resolution without change in any of the pertinent points under consideration.

DESCRIPTION OF THE INVENTION

It is an object of the present invention to provide for such a new encoding which permits such increase in package densities or provides for a more comfortable margin of safety as far as the read resolution is concerned, but utilizes the same restrictions imposed by the tri-period codes, i.e., the ratio of minimum spacing of flux reversals and read resolution being as small as 2:1. It is another object of the present invention to provide for bit group encoding wherein, e.g., the boundaries are made available for recording.

In accordance with the principle aspect of the present invention, it is suggested to encode bit groups of variable length by means of flux reversal and transition pattens of correspondingly variable lengths, whereby the length variations are selected to accommodate rules concerning the maximum number of permissible flux patterns under the constraint that, for example, the minimum flux reversal separation time is larger than a bit frame and cell length (in time) and, for example, twice the code read resolution. The minimum spacing of flux reversals is larger than the bit frame width throughout. If, for example, the resolution is as large as half the minimum spacing, then the number of available flux patterns for encoding $m$ bits may be less than $2^m$. I have discovered, however, that by using particularly variable bit string length (variable $m$) the number of unique bit group patterns needed is less than seemingly needed within a given length of a bit string, if for each bit combination not represented a selective string length extension beyond the given length takes place for encoding. Under these conditions, both, a larger read resolution and a higher data package density can be achieved as compared with the known codes.

The basic bit group that is "normally" encoded may have length ml. The number of bit value combinations that may occur is $2^{m1}$. The number of patterns available may be less than $2^{m1}$. If, therefore, one (or several) particular bit combinations of $m1$ bits cannot be encoded for lack of an available pattern, it will lead to field extension for encoding a larger number of $m2$ bits as a group of which the first $m1$ bits have the particular combination that has not been encoded within the $m1$-bit format. On the other hand, take another group of $m2$ bits, having as its last $m1$ bits the same particular combination. These $m2$ bits do not have to be encoded by a pattern unique as to these $m2$ bits if the first $m1$ bits of that group of $m2$ bits is encoded by a pattern unique to that subgroup of $m1$ bits. Thus, less than $2^{m2}$ unique flux reversal patterns suffice to encode $m2$ bits, if some of these bits are already encoded by a unique pattern and the remaining bits can be encoded together with additional bits that follow.

The invention can also be understood from a different aspect. Encoding $m1$ bits under some constraints concerning resolution and minimum spacing of flux reversals may render the boundaries between $m1$ bits long groups unavailable for placement of a flux reversal. When and if encoding were limited to fixed cell lengths of $m1$ bits, these boundaries could never receive such reversals. Extending the encoding for some cases (i.e. for some bit value combinations) to a cell having length that is an integral multiple of $m1$ and having correspondingly more bits renders the boundaries between these short cells available for placement of flux reversals. In other words, these short cell boundaries have been made available for reversal placement within the larger or extended cell.

The extended cell has also boundaries and as such, they seem not to be available for flux reversal placement; however, these boundaries are available also for reversal placement, because cell extension does not work from large cell to large cell, but from the end of any small cell (whose encoding is completed), if the next $m1$ bits are not encodable by one of the patterns for $m1$ bit encoding. This way, there are never any boundaries on the entire track which are a fortiori free from or unavailable for flux reversal placement.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGS. 1, 1a through 1d are schematic representations of flux reversal patterns for various known codes;

FIGS. 2a, 2b and 2c show similar type representation for a code in accordance with the preferred embodiment of the invention with FIG. 2d explaining terms used; and FIGS. 3a and 3b are diagrams for record and reproduce circuits for realizing the encoding as per FIGS. 2a, 2b and 2c.

DESCRIPTION OF THE DRAWINGS

The principles underlying the invention will be developed step by step with frequent reference to the drawings. The several definitions used here should be stated explicitly first.

Bit frame width or bit cell width D is the incremental spacing or field on the storage medium alotted to one data bit. The same term, however, is used in time. Frame width as a spacing is equal to the speed of relative movement between storage medium and transducer multiplied by the frame width in time. The inverse of the frame width in time is the data rate (1/D). Bit group or bit string cell width is an integral multiple of D, the integer will be designated by $n$. The smallest distance between transitions or flux reversals is defined as such and represented by M, and again this may be understood as distance or as time delay between read back signal peaks, whereby the system parameter constant, speed between record carrier and transducer, serves as conversion factor.

The read solution R is actually the equivalent of a "window" within which a read back peak may appear to be attributed to a particular position. The lengths of that read resolution is, therefor, the distance from a (theoretical) peak position to the mid point to the preceding position, plus the distance to the mid point to the succeeding position (see FIG. 2d). As a consequence, the read resolution R is the smallest difference as between differently long distances between transitions which the readback system must recognize. Again, read resolution is interchangeably used in time and as spacing.

Figure 1A:
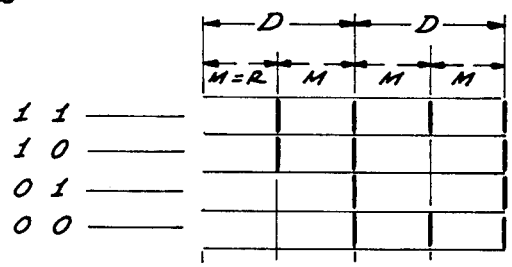
Figure 1A:
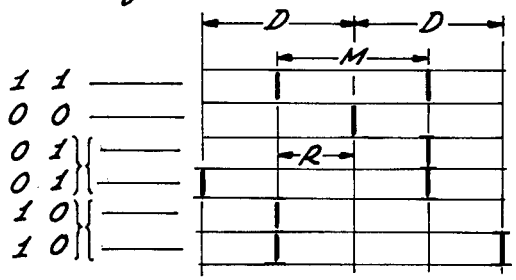
Figure 1A:
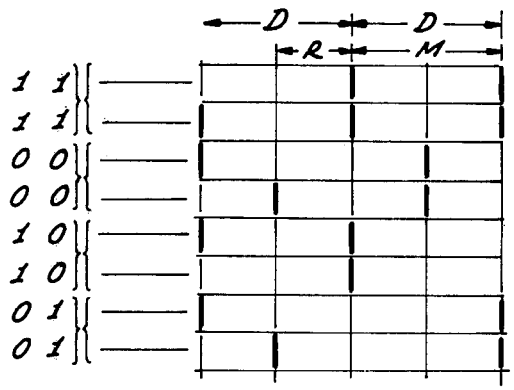
Figure 1A:
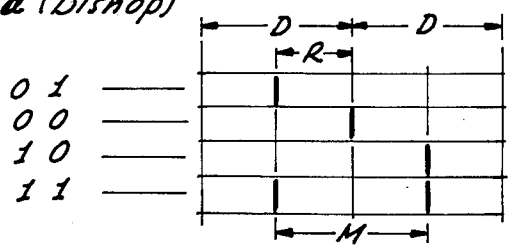

For a better understanding of the invention, the several known encoding formats will be considered from a somewhat different point of view as usual; namely, on basis of bit groups. The flux reversal patterns as used in most known codes are assignable to individual bits, and the pattern for bit groups is a composite one. Heavy lines in FIGS. 1 and 2 denote transitions. FIG. 1a shows the four possible bit combinations of two bivalued bits encoded in the frequency doubling code. One can readily see that the read resolution R is equal to the smallest spacing of transition M, and the bit cell or frame width D is twice that value.

The so-called tri-period codes mentioned above operate under the constraint that the minimum distance M between transitions be twice the read resolution R. These codes do not encode bit groups as such, but have different patterns for a bit or a bit value depending upon the pattern that is used for encoding the previous bit. This results in bit group patterns as depicted in FIGS. 1b and 1c.

FIG. 1b shows the code as used, for example, in U.S. Pat. No. 3,235,855 and No. 3,414,894, and is widely used today. Two of the two-bit combinations are each represented by two different transition patterns, because the second one for (01) cannot be used, if the two preceding bits had value (10) and were encoded by the second pattern for these two bits, or if the two preceding bits were also a (01) combination. The second one of the two patterns for (01) could not be used in these situations, as that would violate the rule that two transitions must not follow at spacing closer than $M (= 2R)$. In other words, the rule that signal peak and transition spacing M must not be smaller than the frame width D makes it impossible to assign just one flux reversal pattern to each bit value. Consequently, the same bit group will occasionally appear in different pattern configurations.

FIG. 1c shows a different tri-period code as disclosed in U.S. Pat. No. 3,108,261. Each bit pair can be represented by two different reversal and transition patterns. Multiple patterns are needed here for the same reason that applied to FIG. 1b; not every pattern can follow any other pattern (for four sequential bits), because of the rule that the minimum flux reversal spacing M must be equal to or larger than 2R. It will be recalled that this rule is the inherent result of the requirement for these codes that minimum flux reversal spacing M must be equal to the frame length D while in Manchester or Frequency Doubling, $M = D/2$. That way, the data package density could be increased over the Frequency Doubling and Manchester formats.

The reason this association between bits and flux patterns works with, on the average, less flux reversals than there are bits, is that in at least some cases two patterns are provided for a two bit combination and for each such case one or the other pattern can follow always any of the patterns for the three other two-bit combinations. On the other hand, the individual bits are still recognizable in the encoding, as definite flux patterns are assigned to the individual bits.

Stating it differently, upon taking just one bit group pattern in either FIG. 1b or 1c, for each of the two-bit combinations, the four patterns so selected will not meet the requirement $M = D$, $R = D/2$. Apparently then, it is not possible to encode bits under these constraints with just one flux reversal pattern per bit value. Another observation is in order here; bit cells and bit group cells are permitted to have transitions placed on the boundaries only because of the multiple patterns available and necessary for each bit value. Whenever the code patterns have transitions on both boundaries, they can be concatenated, but, e.g., a pattern with a leading boundary transition cannot be concatenated to one that does not have a trailing boundary transition.

The concept of unabiguous bit patterns under the same constraints ($R = D/2 = M/2$) is shown in U.S. Pat. No. 3,508,228, wherein any one particular combination of two bits is encoded in a pattern. The patterns are depicted in FIG. 1d. The figure shows five patterns, four are used for encoding, the fifth one is for control. It can be seen that individual flux patterns are no longer associated with individual bits, but each bit pair has an unambiguous code. However, the data density is not improved over the codes as per FIGS. 1b and 1c. Moreover, a close inspection of the patterns reveals that the boundaries are not available for placement of flux reversals. The pattern could be phase shifted by $\pm R$, but the particular positions as displaced by $\pm R$ would always be free from flux reversals. It is convenient to refer to these positions as boundaries.

In developing the concept of the invention, the question is to be raised how many different patterns are available in a field having length that is an integral multiple of the read resolution R, observing the rule that flux reversal spacings must not be smaller (but can be larger) than a given value for M, whereby, of course, one multiple bit field follows another one in a series of arbitrary length.

For the field length of 4R, as shown in FIG. 1d and $M = 2R$, the answer is 5; these are actually the four patterns illustrated and used for two-bit pattern encoding as per U.S. Pat. No. 3,508,228. The fifth pattern is one with no flux reversals at all. The fifth pattern, as used in the patent for control, can be regarded as an occasional alternative to the "no flux reversal" pattern, but should not be counted per se. Therefore, the encoding scheme as per FIG. 1d uses fields of two bits ($m = 2$) for encoding by these patterns under the constraint $M = 2R$, whereby five patterns are actually available and only four are needed. It is important to realize that field length for storing bit groups can be expressed in two ways. One, is an integral multiple of read resolution R, the other (usual) is an integral multiple of bit frame D. For reasons of uniformity, it is practical to provide always for a relation $n \cdot R = m \cdot D$, at least for particular integers $n$ and $m$. In the past, there is usually $n = 2m$.

I have discovered that the patterns available under the stated condition follow the so-called Fibonaci series; that is to say, the number of flux patterns in a field length of $n \cdot R$, with n being a positive integer, is given by the number in the $n^{th}$ position of the Fibonaci series, beginning with 1, but excluding the first 1 in the series.

| Field length | 0 | 1 | 2 | 3 | 4 | 5 | 6 | 7 | 8 | 9 | n |
|---|---|---|---|---|---|---|---|---|---|---|---|
| Fibonaci series | 1 | 1 | 2 | 3 | 5 | 8 | 13 | 21 | 34 | 55 | F(n) |

The Fibonaci series is defined in that each number in the series, beginning with 1, is the sum of the two preceding numbers in the series.

All these known encoding formats operate on basis that the number $m$ of bits stored and encoded in a field length $n \cdot R$ is selected so that $2^m \leq F(n)$. $2^m$ represents the minimum number of flux reversal combinations needed to distinguish $2^m$ in different numbers (namely, the numbers expressible in $m$ concatenated, bivalued bits). The Fibonaci number $F(n)$ defines the number of available flux patterns for encoding under the stated constraints concerning read resolution and minimum spacing M of flux reversals. The equation above interrelates needed and available patterns, and can be construed as a relation between $m$ and $n$. The value of $m \cdot D$ is the frame length of a group of m bits. On the other hand, this frame length was defined as multiple of read resolution R. i.e. $n \cdot R$. In the known tri-period codes, $D = 2R$ so that $n = 2m$. Under these conditions the number of needed patterns ($2^m$) for $m$ bits number of available patterns F (2m) are related as shown in the table 2 (using only even numbers $n$).

| n = 2m | 2 | 4 | 6 | 8 |
|---|---|---|---|---|
| f(n) | 2 | 5 | 13 | 24 |
| $2^m$ | 1 | 4 | 8 | 16 |

This table shows that the known encoding formats have more patterns available than needed as minimum. All known encoding formats operate under the generalized constraint that $m$ must not be higher (or data must not be denser on the track) so that $2^m$ remains below or equal the Fibonaci series number F(n) for the space actually used to record the $m$ bits. It should be noted that the encoding under FIG. 1c and 1b uses actually still more patterns because of the selection ambiguity and not all patterns can be concatenated directly. Patterns available under all circumstances must not have transitions on pattern field boundaries! Nevertheless, the number of patterns available which, in fact, meet the rule is given by the Fibonaci series, and the known tri-period codes use "illegal" patterns only on an alternative basis, to be able to assign unique patterns to individual bits. FIG. 1d shows clearly that without multiple patterns for the same bit or bit combinations, only five patterns are available for two bits for $R = 2M$ and $M = D$.

From a different point of view, under the rule $R = M/2$ and $D = M$ and $n = 2m$, FIG. 1d shows that the only way of encoding two bits as a group with unique legal reversal patterns required to forego pattern assignment to a bit value. The encoding as per FIG. 1b and 1c using the same constraints as to spacing, includes illegal patterns only, so that by such use individual subpatterns can be assigned to individual bit values. Of course the individual pattern-bit group value association is arbitrary.

It should be mentioned here that the constraint concerning the minimum or smallest permissible distance between transitions does not only apply within any pattern, but also across the bit group and pattern field boundaries. This is the reason none of the illustrated patterns of FIG. 1d has a transition on a pattern field boundary, and the violation of this rule makes some of the patterns in FIG. 1b and 1c illegal in certain cases The statement that the number of available flux reversal pattern combinations should not be smaller than the number of needed combinations seems to state the obvious. The invention shows a way how to circumvent this seemingly logical rule.

As a first step here, I have discovered that for increasing the data density, the requirement should be dropped that the data rate distance or frame width D be an integral multiple of (or equal to) the read resolution R. However, upon maintaining the requirement of $M = D$ or even requiring $M > D$, the situation arises that less patterns are available than seemingly needed for encoding bit strings or groups. However, upon using different length fields for differently long bit strings to be encoded, and varying the length depending on particular, selected bit values, or combinations of values it is possible to accommodate more bits than permissible if fixed field and bit string length were used for pattern encoding.

Applicant uses a first field length $n1 \cdot R$ ($= m1 \cdot D$) for pattern encoding $m1$ bits, where $2^{m1} > F(n_1)$, and a second field length, $n_2 \cdot R$ ($= m_2 \cdot D$) for pattern encoding $m_2$ bits, where also $2^{m2} > F(n_2)$; but in combination it turns out that conditions can be developed where the number of actually needed unique pattern combinations equals the number of available pattern combinations.

The basis bit group encoded may have length $m1$ and the extended bit group has length $m2$. If, for example, one particular bit combination of $m_1$ bits cannot be encoded for lack of an available pattern, it will lead to field extension for encoding $m2$ bits as a group of which the first $m1$ bits have the particular combination. On the other hand, a group of $m2$ bits may have its first $m1$ bits already encoded by a particular pattern combination as available for encoding $m1$ bits. Under these conditions, the last $m1$ bits within this group of $m2$ bits does not have to be encoded by a pattern within the short, $m1$ bit-long group. Rather, these last $m1$ bits may be encoded together with additional bits, beyond the group of $m2$ bits presently considered, by extending encoding from the beginning of these last $m1$ bits for altogether $m2$ bits which, of course, leads beyond the group of $m2$ considered originally. This way, less than $2^{m2}$ flux reversal patterns suffice to encode $m2$ bits.

It must be understood that grouping of bits is not altogether based on a fixed enumeration and bit-to-group assignment, and, thus, cannot be understood as a concatenation of cells of fixed length. Any $m1$ and any $m2$ consecutive bits can be considered as a group. The grouping, however, has meaning for encoding only if, in fact, a pattern is available for the particular bit combination of $m1$ or $m2$ bits; if not, the grouping is dropped in favor of a different one. It is convenient, however to divide the bits and bit group spacing on the track into cells of $m1$ bits each, but without requiring that each such group is self-contained and self-sufficient as far as encoding is concerned. The extension grouping is then a convenient assembly of several $m1$ bit groups to complete the encoding.

The data track or recording track to be made can be thought of as divided in bit group cells of $m1$ bits long. Whenever $m1$ consecutive bits are encodable by a pattern, they are so encoded and the process proceeds to the next $m1$ bits, etc. If, under these operating conditions, a pattern is not available, the encoding is extended just for that purpose to cover $m2$ bits.

The instrumentality used here for encoding is the placement of flux reversals on boundaries. $m1$ bits, when encoded as such, are encoded by a pattern that does not have flux reversals on the cell boundaries. If, however, two or more groups of $m1$ bits each are combined to a larger group of $m2$ bits, the boundaries between the $m1$ bits long cells within the $m2$ bit group are available for recording and placement of a flux reversal. This way, all boundaries between $m1$ bits long cells are potentially available for such placement.

The broad principles outlined above, together with additonal rules will be developed next in relation to the preferred embodiment of the invention. As shown in FIG. 2a, a basic bit string $m_1 = 2$ is selected, defined by and to be accommodated by a field length of such a 3R.

The Fibonaci number for this case is 3 which means that three flux reversal patterns are available meeting the condition of $M = 2R$. Two bits require four patterns for encoding and it can be seen that the bit combination (1 1) is not encoded. The selection of the specific bit combination and included in the basic or short encoding field for multiple bit pattern encoding is arbitrary.

The dotted transition on the boundary of the 01 bit combination refers to the fact that within the chosen format constraints, a transition cannot be placed on the boundary of 2 bit cell. The no-transition pattern is legal within the chosen rules, but it is undesirable to provide for long stretches on the track without any transition. Thus, for particularly long 01 bit group strings these additional transitions are used.

Turning to FIG. 2b, there is illustrated the extended encoding pattern for the extended bit groups or strings. The extended bit string has $m_2 = 4$ bits. The resulting field length is 6R or twice the length of the short field. It is not necessary in principle to have the extended bit string as an integral multiple of the short string, but to operate with variable field lengths equivalent to a variable bit frame width is very impractical though feasible in principle.

The Fibonaci number for the field length 6R is 13 (see table 1 for $n = 6$), so that thirteen different flux reversal patterns under the stated rule are available generally. Again, 13 patterns are not sufficient to accommodate per se four bits, as that would require 16 patterns! However, encoding is complete as will be shown next.

FIG. 2b does not show all of the thirteen patterns available for 4 bits. Out of the thirteen available patterns combinations, nine patterns are actually produced just by concatenating any two of the patterns in accordance with FIG. 2a. This, of course is the equivalent of four-bit combinations resulting from concatenating any two of two bit patterns 00; 01; 10. This then leaves four available patterns which are used to encode the four, four-bit combinations, having 11 as the first two bits. These patterns are specifically depicted in FIG. 2b.

The encoding method, therefore, works in principle as follows: any of the two-bit combinations 00; 01; 10, are being encoded by the three patterns shown in FIG. 2a. Any four bits composed of two two-bit combinations 00; 01; 10; are encoded by concatenating the respective two patterns under FIG. 2a. Whenever the bits 11 occur, they are not encoded as such, but the following two bits are included by way of a look-ahead procedure, and the resulting four different possibilities are encoded by one of the four patterns of FIG. 2b. As to four bits, this can occur for two bits 11 in the first two bit group or in the last two bit group. When the first two bits of a four-bit group are 11, the values of the next two bits are detected and one of the patterns of FIG. 2b is chosen accordingly. This then exhausts the thirteen available patterns. When the last two bits of a four-bit group has the combination 11, the first two bits of that group are already encoded, no unique pattern as to these last two bits, or as to these four bits is needed. Rather, the next two bits are looked for and included for encoding.

The situation, thus, presents itself as follows: To encode four bits one does need sixteen pattern combinations, but the four-bit field has only thirteen permissible patterns available under the chosen general constraint $M = 2R>D$, $m = 2$, $n = 3$. In fact, three-bit combinations seem to have been left out and are not directly encoded. These are the bit combinations 0011; 0111; 1011. However, these three bit combinations do not have to be accommodated by unique patterns because the first two bits in each case are already encoded and the two 11-bits are encoded together with the next two bits.

Two bits of value (11) not being the second two of a 1111 grouping always lead to encoding extensions and will be encoded by one of the patterns of FIG. 2b depending on and using the next two bits for encoding. Thus, the selective extension of the encoding field length is the key to the point that a seemingly insufficient number of patterns actually suffices.

The patterns as per FIG. 2b can be understood as covering two short cells of $m1$ bits each. The boundary B between these two concatenated short cells are provided with flux reversals or transitions, and these, so to speak, additional transitions, make it possible that altogether enough patterns are available.

In the chosen example, it is repeated that just 3 different patterns are available for encoding just 2 bits by themselves. Using short cells only, and using the encoding patterns as per FIG. 2a, 9 patterns are available for 4 bits on that basis. The four specific patterns of FIG. 2b are now available in addition, using the boundary B between the two subgroups as stated.

Thus, the common boundary B of two consecutive bit group cells (2 bits long) is available for placement of a flux reversal (FIG. 2b) if the first two bits are not encoded by a unique pattern. However, potentially the end boundary of two two bit group cells is also available for placement of a reversal if the two bits of the first two bit cell was encoded as per FIG. 2a. Such a situation leads to a concatenation of a pattern of FIG. 2a with pattern of FIG. 2b, covering six bits, of which the first four bits seem to have a flux reversal on its end boundary, which, in fact, is a flux reversal in position B within the four bit pattern that followed the first two bit pattern in the six bit field so defined and encoded.

The principle of the invention can thus be seen in defining a basic cell group wherein certain (e.g. boundary) positions are not available for placement of a flux reversal and transition. However, upon enlarging that group length these places become available wherever needed on the track.

The invention can also be seen in the discovery that bit groups can be made to interrelate so that particular bit combinations need not be encoded per se, because a portion of such combination is encoded separately and the remaining portion is encoded together with some of the bits that follow. In the present example, no patterns are needed for 0111; 0011; 1011; because the first two bits are encoded by themselves, and the two bits 11 are encoded together with the two bits that follow.

The rule, therefore, is that the number of bit combinations not encoded by and in the basic field, multiplied by the number that are encoded, gives the number that need not to appear as encoded in an extended field, as these cases lead to further extensions. The number of bit combinations actually encoded by the basic field is given by the Fibonaci number for that field length $F(n)$. The number of bit combinations not encoded is given by $2^{ml} - F(n_1)$. In the example above, $n_1 = 3$, $F(n) = 3$, $m_1 = 2$, so that $2^{ml} - F(n_1) - 1$. Thus, there is one bit combination not encoded, namely, the bit combination 11 that was left out in the pattern of FIG. 2a.

The extended field length (limiting presently to doubling) is given by $m_2 = 2m_1$, so that also $n_2 = 2n_1$. The number of available bit combinations is F ($n_2$) 13 as per table above. The number of bit combinations of a bit string $m_2 = 2m_1$ is $2^{m_2} = 2^{2ml}$ (or 16 in the example).

The number of bit combinations which do not have to be accommodated by unique code patterns, because they lead to further field extensions as defined, is ($2^{ml} - F(n_1)$) · $F(n_1)$, provided $m2 = 2m1$. The system works whenever so defined is not smaller than $2^{2ml} - F(2m1)$, as that latter number is the number of missing possibilities for pattern encoding in an extended (doubled) field length.

It should be noted that in the conventional encoding $2^m - F(n)$ was always a negative number or zero, i.e. there were always sufficient or more patterns available than needed. An increase in package densities will result only when these differences $2^m - F(n)$ are made positive, and the invention relates to rules, permitting encoding with less patterns than seemingly needed.

Not all thusly related numbers produced by integer combinations of $m_1$, $m_2$, $n_1$ and $n_2$ will lead to results which have practical significance. These integers should be related by the additional conditions that $n_1$ . $R = m_1$ . $D$ and $U_2$ . $R = m_2$ . $D$ which means that pattern boundaries should coincide with data field and bit group frame boundaries (or centers or any other fixed phase point in relation to bit frames). Again, this is not a necessity in principle, but deviation therefrom leads to unequal data rates to be accommodated through special buffer and/or speed control of the recording medium, which is possible in principle but increases equipment expenditures drastically.

The rules above were developed under the specific constraint of $R = M/2$. In other words, the number of available patterns for encoding a given number of bits was developed on the basis that the read resolution is half the minimum flux reversal spacing. It was that specific constraint which lead to the Fibonaci series of available patterns. The situation, however, can be generalized. If N is the number of available patterns under any conditions of constraint for a particular field length to be used for accommodating m bits, then $2^m - N$ is the number of bit combinations that cannot be encoded with a fixed m bit format. Using the principle of field extension, encoding is possible generally as follows:

Again, let $m1$ be the number of bits to be "basically" encoded as a group, but the number of patterns available under any constraint is $N1 < 2^m$. Whenever a bit combination occurs that is not encoded by one of the pattern, an integral multiple of such bit groups, having $r$ . $m1$ bits, is used for encoding. Within the chosen constraints only $N_2 < 2^{rm1}$ patterns may be available for encoding of km1 bits. However, the method as outlined above works generally if the following rule is observed. For a hypothetical cell $r$ . m1 bits long, the number of patterns actually available is at least $N1^r$ (because N1 patterns are available for an m1 bit long cell). Additionally, the following number of bit value combinations must be encoded within the $r$ . $m$ bits long cell format, because they will not lead to further extensions:

$$(2^{m1} - N_1) \cdot N_1^{r-1} + (2^{m1} - N_1)^r$$

The first term of the sum defines the number of bit value combinations of which a subcombination covering the first m1 bits is not encoded by one of the N1 patterns, while the remaining subcombinations each are encoded by one of the N1 patterns. The second term in the sum defines all those bit combinations wherein each and all bit value subcombinations are not encoded by one of the N1 patterns. However, in cases, this term may not have to be considered, if the system works with selective multiple extensions.

Thus, the number N2 of patterns within an extended $r$ . $m1$ format must be at least equal to or larger than $$N1^r + (2^{m1} - N1) \cdot N1^{r-1} + \text{(possibly)} (2^{m1} - N1)^r$$

plus additional terms; or $$N2 \geq 2^{m1} \cdot N1^{r-1} + (2^{m1} - N1)^r$$

plus additional terms.

Any bit combination not included in the enumeration on the right hand side will lead to a format extension. The "additional terms" in the formular refer to additional requirements, which are optional to some extent, but must be considered in cases to avoid the possibility of ad infinitum extensions. Also, multiple or excessively multiple extensions may be undesirable because of hardware costs involved. Thus, it may be required additionally that extensions beyond the $r$ . m1 format are permitted only, when in less than half of the short cells and/or never in two consecutive short cells, or only in one (except the first one) such short cell or even only in the last one, there is a bit combination not encoded by one of the N1 patterns.

Figure 3A:
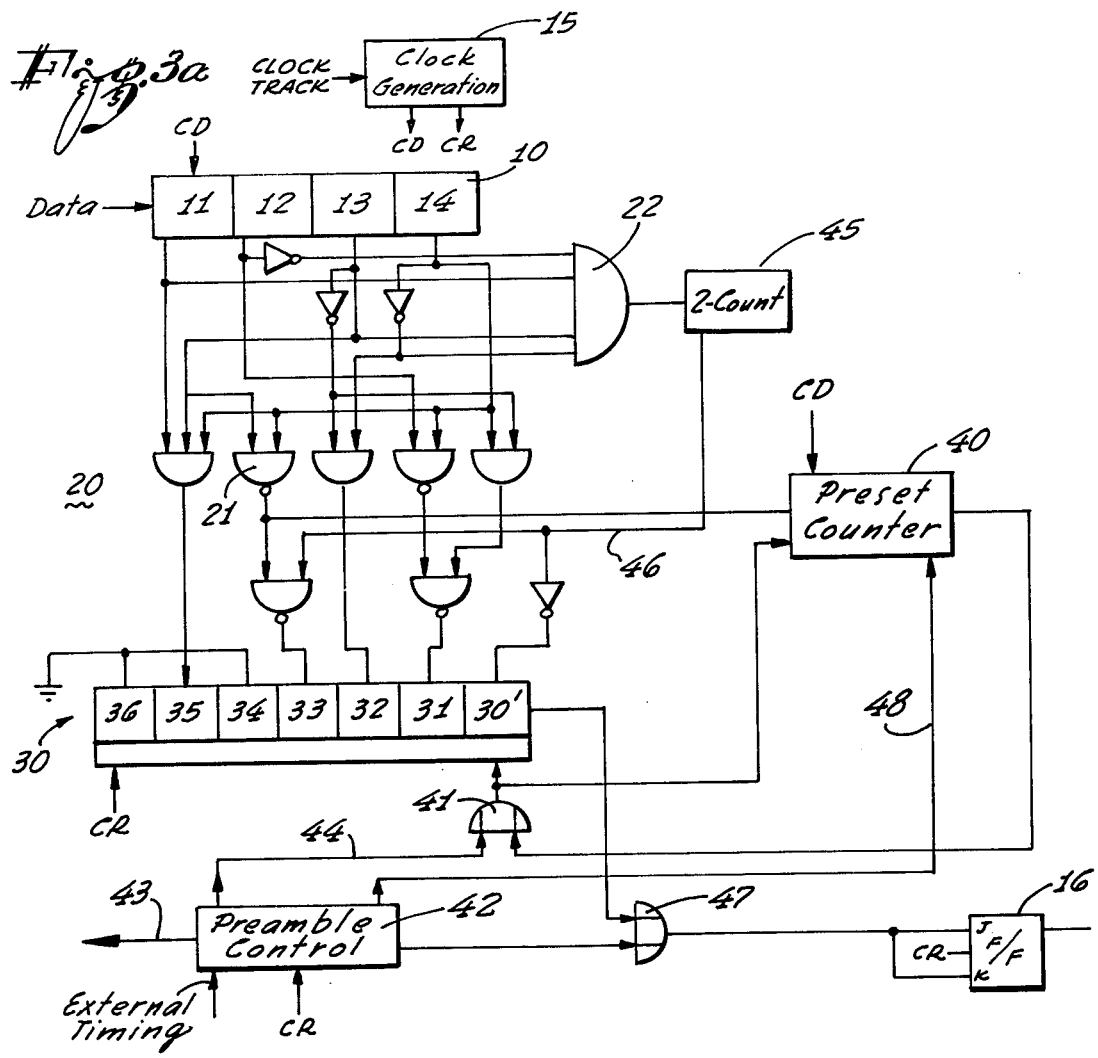

The method of the invention, particularly for the preferred example of encoding outlined above, will now be explained with reference to FIGS. 3a and 3b, respectively showing means for encoding and decoding in accordance with the invention. Turning first to FIG. 3a, data is fed by an input channel 1 to a shift register 10. The data are supplied from an external source as bivalued bits. The data rate is 1/D as defined above, with D defining the data frame length in time for an individual bit.

Register 10 has at least four stages, 11, 12, 13, 14, and receives and shifts the data bits in response to clock pulses CD, provided by a circuit 15. The circuit 15 operates in response to an external clock signal as derived, for example, from a clock track on a magnetic disk. The disk has many tracks, one of them being a clock track, and another one will serve as storage facility for the data when applied to channel 1. Circuit 15 may include an oscillator which is phase locked to the reproduced clock track signals. Circuit 15 derives the required clock signals from the oscillator and provides several different trains of clock pulses in proper phase relations to the clock track signals as recorded and also in proper phase relation to each other. The data shift clock CD is one of the clock signals, for example a 4MHZ signal. Another signal is CR having 6MHZ, and is used as record clock, thus determining the rate of possible flux transitions or reversals that may be produced. The oscillation period of clock CR is equal to the chosen read resolution R which is actually chosen therewith. Thus, the two frequencies CR and CD actually determine the chosen ratio for m and n in the encoding scheme, because preferably $m \cdot D = n R$ for specific integers of m and n. Presently, $m = 2$ or 4, $n = 3$ or 6.

Reference numeral 16 refers to the write control flip-flop for the specific track and receives the signal CR as clock. Flip-flop 16 is of the jk variety and is operated as toggle flip-flop whenever true signals are applied to both its jk inputs. The flip-flop 16 controls one transducer (not shown) if the disk system is of the head per track type. Alternatively, flip-flop 16 controls the single write transducer for a disk surface if the disk system is of the movable head type.

The shift register 10 has four parallel outputs, respectively from its stages 11, 12, 13 and 14, presenting signals which in any instant represent four consecutive data bits. These four bits are applied to a particular decoder or code converter 20 comprised of several inverters, "and" gates and "nand" gates. The decoder is constructed to convert regular binary signals, i.e. two or four bivalued bits into a three or six bit code corresponding to the flux reversal pattern of FIGS. 2a and 2b. It should be noted that within this six bit format, these code converter output bits represent flux reversals, not flux directions. In the following I distinguish between data bits and record bits; the record bits define transitions which are spaced-apart by read resolution R.

The circuit connection of code converter 20 leads to four inputs respectively of four stages of a register 30 which serves as parallel to serial converter. Specifically, the four code converter outputs lead to stages 31, 32, 33 and 35. Stages 34 and 36 receive permanently false signals. The code converter 20 is constructed so that all of the gates (except the one most to the left) together with the permanently false input on stage 34, provide among other functions, the conversion of the three two-bit codes into the three record bit flux reversal patterns as per FIG. 2a, i.e.

$$00 \longrightarrow 010$$
$$01 \longrightarrow 000$$
$$10 \longrightarrow 100$$

All gates of circuit 20 provide also the re-encoding as per FIG. 2b.

$$1100 \longrightarrow 001000$$
$$1101 \longrightarrow 001010$$
$$1110 \longrightarrow 101000$$
$$1111 \longrightarrow 101010$$

It should be noted that the leading boundary of either bit group frame is not encoded, only the trailing edge.

Upon detecting a (11) combination in the two-bit positions farthest into register 10 (stages 13 and 14), gate 21 responds specifically. A 1 is set into stage 33, and stage 35 receives meaningful information from the one gate, 23, which does not provide meaningful code information for two-bit code conversion. It should be noted that the two-data bit encoding differs from the four-data bit encoding by absence or presence of a record bit from gate 21 for stage 33. This stage holds the bit on the trailing edge boundary for the two bit encoding field. When stage 33 receives a "zero" bit, an indication is provided therewith that the two preceding bits were encoded as a group. Upon decoding, the bit value in this position will be used to differentiate between the two field lengths. The seventh stage 30' of register 30 will be explained later.

Gate 21 provides a specific control signal to an preset up-counter 40, which signal is effective therein only when the counter receives a preset timing signal from gate 41. Such a timing signal is produced, for example, when the counter reaches overflow. The counter is preset to a number in accordance with the control signal from gate 21. Without a signal from gate 21 indicative of a (1, 1) combination in stages 13 and 14 of register 10, the counter is set to a count stage 3 down from its highest value. A signal from gate 21, which is indicative of a (1, 1) bit combination in these two farthest positions of register 10 presets the counter 40 to a count state 4 down from its highest count value. The counter counts data clock pulses CD from that preset value up to overflow.

Counter 40, when reaching overflow provides a strobe signal to register 30 via "OR" gate 41. This strobe signal sets the decoder output signals as they exist at that instant into the several stages of register 30. Whenever two bits are in the two stages 13 and 14 of register 10, which are not (1, 1), they will be re-encoded, and three corresponding record bits will be set into stages 31, 32 and 33, stage 33 invariably receiving a zero bit. Whenever the two bits in stages 13 and 14 are (1, 1) all four bits in register 10 will be processed to obtain four bits of a six bit record code for stages 31, 32, 33 and 35. Zero bits are always applied to stages 34 and 36, as the code patterns so require.

Now it has to be observed that register 30 is also a shift register, receiving pulses CR as shift clock, while counter 40 receives CD as count signal. Assuming, for example, that three record bits have been strobed by a signal in OR gate 41 into register 30; these three record bits are shifted into and through output stage 30' of register 30 by the three clock pulses CR (two pulses CD) following the parallel strobing into register 30. The record bits as held in stage 30' are sequentially applied as gating signals to the write control flip-flop 13. Counter 40 was preset to overflow −2 and is incremented concurrently. As the bit that was strobed into stage 33 reaches stage 30', counter 40 overflows and produces another strobe pulse. In the meantime, two other data bits have been shifted from the two states 11 and 12 in register 10 to the two stages 13 and 14 of the register, and two new bits have been set into stages 11 and 12. This is so, as two data clock pulses for two shift operations in register 10 are produced for each 3 write clock pulses CR.

It should be noted that code converter 20 receives always four bits, but the output of gate 23 fed to stage 35 is meaningless when the data bits in stages 13 and 14 are not (1, 1). That output bit for gate 23 together with the zero bits in stages 34 and 36 are shifted also through register 30, and will reach stage 32, but will never reach stage 30'. Three clock pulses CR after decoder 20 performed a two-bit decoding, the decoder output will update stages 31, 32 and 33 because the strobe pulse follows 3 clock pulses from the previous loading of register 30.

As stated, four data bits are always applied to code converter 20. Should the bits in stages 13, 14 be (1, 1), then the re-encoding involves the outputs of all four stages in register 11, and again six record bits are set into stages 31 to 36. However, all six record bits are meaningful in this instance. Concurrent response by gate 21 presets the counter 40, so that it will take four pulses CD before overflow is reached. Thus, the six bits as held in stages 31 to 36 will be shifted out of register 30 by the six shift pulses CR that are produced during a period covered by four data clocks. In the meantime, four other data signals have been shifted into the four stages of register 11, and they are four-or-two-re-encoded depending on whether or not (1, 1) are the first two bits. In one case, the strobe pulse from OR gate 41 will occur six pulse CR thereafter; in the other case, three pulses CR thereafter. This, then, is the implementation of the selective field extension for pattern selection and recording.

The circuit as described thus far would produce a transitionless track portion for a string of (0, 1) bits which is a legal and available pattern under the rules outlined above. However, long track portions without flux reversal are clearly undesirable for reasons of noise. Therefore, the circuit includes provisions for placing transitions in selective, unique positions. This is the meaning of the dotted marking in FIG. 2a. Specifically, it is a reasonable rule to place these additional markings for three consecutive bit groups 01, in between the respective 2-bit group and field boundaries. This is depicted in FIG. 2c.

A gate 22 is connected to the four parallel outputs of register 10 so as to respond to a (0101) data bit combination in the register. Correspondingly, stages 31 to 33 hold three record bits each having value 0. As the data bit combination does not include a 11 combination, preset counter 40 is operated so that the three zero record bits corresponding to the re-encoded first group of data bits (0, 1) will be shifted out of register 30 through stage 30'. The response of gate 22 has caused a counter 45 to be incremented by "one." Counter 45 actually counts up to "two" only, and thus counts the number of consecutive (01) pairs. As the three zero record bits, corresponding to the first (0, 1) data bit group, are shifted into stage 30', the concurring data clock shifts this first (0,1) bit group out of register 10 (i.e. they are dropped), and the second (0, 1) bit combination is shifted into the two farthest stages 13 and 14 of register 10. Additionally, counter 45 resets and nothing transpires further until the next group of three consecutive 01 bit combinations appear.

It is customary to have any recording on a magnetic track preceded by a so-called preamble. This preamble is arbitratily definable and, therefore, details are not necessary for this case, as this has nothing to do with the principles involved. Briefly, a plurality of ones may be recorded, carefully counted as to the number so recorded. These ones are not necessarily derived from channel 1, as the data source does not usually provide the preamble. Looking at FIG. 2b, one can see that a series of ones are encoded by placement of transitions regularly and, in this case, at minimum spacing M.

Since the preamble constitutes a legal data pattern and may be decoded as such on read back, the preamble should terminate with a bit pattern (1110), so that these four bits, when retrieved, will be decoded as a four-bit group, and the first two data bits when encoded do not require the inclusion of two preamble bits for a four-bit encoded pattern. However, this is true only, if the preamble is also treated as data during retrieval.

The generation of the preamble, thus, amounts to permitting write flip-flop 13 to toggle for every other record clock CR and for a predetermined number of times. That process begins on an internal command, for example, by operation of a timing or sector or address-begin marker derived from the rotating disk, and setting preamble control 42 into operation, to feed write toggle control pulses through OR gate 47 as alternative gating signals for write control flip-flop 13.

The preamble may be longer than the equivalent of four data bits. Therefore, data should not flow through channel 1 right after the preamble is begun to write. The preamble control operates, of course, in synchronism with the clocks CR and CD. At a particular point in time, a signal from preamble control 42 is fed to the data source (line 43), to now begin to feed data into channel 1. Precisely four data clock pulses later, an artificial, first load strobe is produced by the control 42 and serves as alternative input for OR gate 41. Now, the first two or four data bits are re-encoded and the counter 40 is preset accordingly.

The counter 40 may normally receive the pulses CR for counting and is, thus, in the overflow count state. The preamble control 42 may hold the strobe output of counter 40 down during preamble generation. The first load strobe generated by the preamble control and applied via OR gate 41 presets the counter 40 in accordance with the gating conditions then provided by gate 21, which determines whether the next load strobe, now from counter 40, will appear after two or after four data clocks CD.

The retrieval of data and presentation thereof as bivalued data bits is essentially little more than the inversion of the encoding as outlined above with reference to FIG. 3a. Bearing in mind the general principle of the invention, the data retrieval requires selective decoding of reproduced signals to obtain data bit groups two or four bits long, and decision making circuitry must be provided to determine when to decode on a two bit level and when to decode on a four bit level, i.e. when to decode three of six retrieved record bits as a group.

Figure 3B:
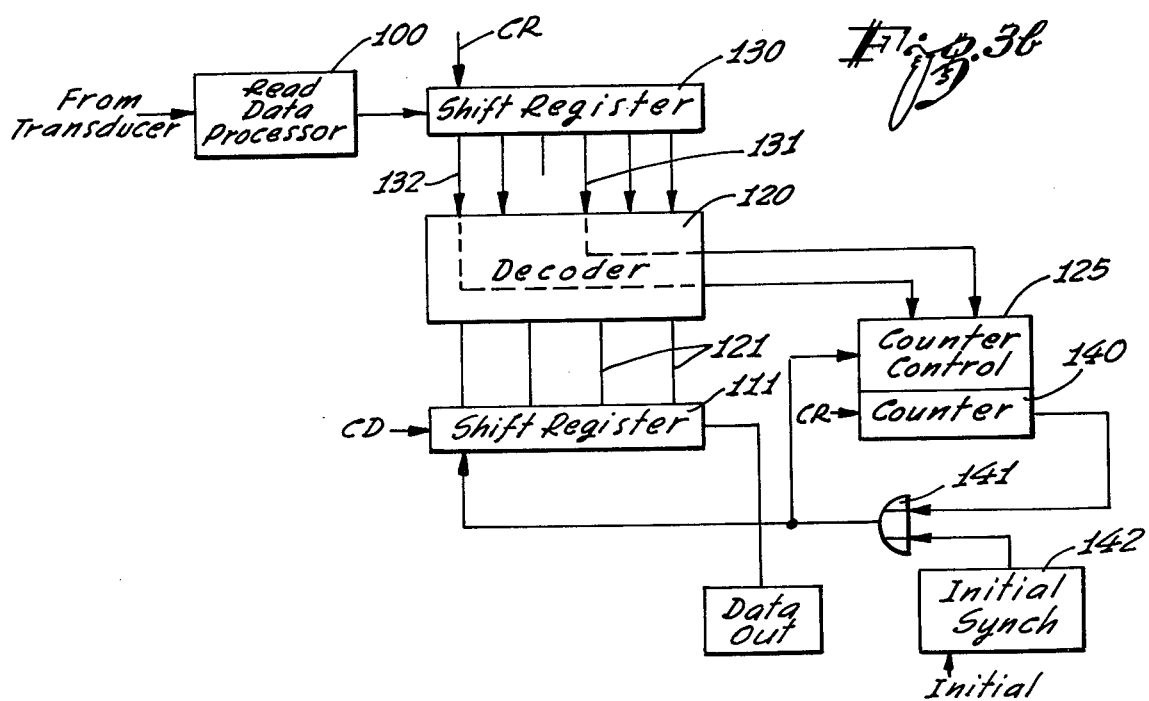

Reference numeral 100 in FIG. 3b denotes circuitry which receives readback on reproduce signals from a read transducer and converts these signals into pulses just as if these signals represented an NRZ recording. Thus, circuit 100 produces a signal train in which 1 bits represent transitions, and pauses in-between 1 bits at the rate of clock pulses CR represent absence of transitions. These reproduced record bits are set into a shift register 130 having at least six stages. The clock pulses CR which are used for shifting in register 130 are analogous to those used in the record circuitry and may bear a fixed relationship to them. The system as such may use a common clock circuit (such as 12) which responds always to the clock signals as recorded on the clock track, and which provides all of the necessary pulses in strict mutual synchronism as far as writing and recording, data inputting and outputting is concerned.

It is, thus, apparent that during continuous rotation of the record disk, signals are continuously presented by circuit 100 and shifted into and through register 130. These reproduced bits (which are not true data bits, but represent only transitions) are continuously applied to a decoder 120, but due to the pattern encoding scheme, the result of the decoder operation has meaning only in specific instants. At some instants, four true data bits are presented in the four output channels of decoder 120, at other instants, true data bits are presented only by the two output channels 121.

The decoder 120 is not shown in detail, because it will be appreciated that its function is the inversion of the operation of code converter 20 of FIG. 3a. Thus, the decoder 120 converts bit patterns corresponding to the flux reversal patterns of FIG. 2b to the four data bits thereof; additionally, the decoder 120 responds to the content of the three stages farthest into register 130 to provide two bits in lines 121 corresponding to FIG. 2a.

The instants in which the decoder output has meaning is determined by circuitry strobing the outputs of decoder 120 into the four stages of a shift register 111, and in parallel by bit format. This circuitry includes an OR gate 141 connected with one input to a circuit 142, responding, for example, to an initiating signal which maybe derived, for example, from disk as a sector or address marker. A first load strobe is produced at least four data clock pulses after such a timing marker.

It should be mentioned here that quite often reproduced signals representing the preamble are not processed as data, so that the preamble has already been stripped from the train of data bits that is presented by the readback circuitry. However, there is no inherent necessity for such procedures, and since the preamble is recorded in the same format and can be interpreted as digital data, it can be so reproduced leaving it up to other circuitry to separate true data from the preamble. Presently, it is important only that at some time during the readback of the preamble (or precisely four data clock pulses after the end of the preamble), a first load strobe is produced, loading two or four stages of register 111 with the output of decoder 120, and for the next two or four data clocks, two or four data bits are serially shifted to the DATA OUT circuit. This circuit may include selective delay circuits for deskewing and temporary buffer.

The first load strobe is also applied to a counter 140, which is analogous to counter 40, and is in its overflow state during waiting periods. Now, the first load strobe presets the counter to −3 or −6 or −9 (down from overflow), depending on particular indications from the decoder 120.

Upon inspecting FIGS. 2a and 2b, one can see that the two bit encoding as to the record bit patterns differs from the four-bit encoding by the placement (or absence) of a record bit in the third bit position (as coinciding with a two data bit field boundary). It will be recalled that this was manifested by the bit valve provided by gate 21 for stage 33 in the record control circuit of FIG. 3a. Thus, whenever a six-record bit field is held in register 130, the stage whose output line is denoted by 131, may hold a one bit in which case the six bits in register 130 define four data bits, which are then and there decoded and re-encoded by decoder 120. The four data bits are strobed into register 111 and will be shifted out thereafter by four data clock pulses. The counter 140 may count record clock pulses CR. Accordingly, a one bit in line 131 causes a strobe pulse to preset the counter 140 to overflow −6, and the next strobe pulse will be derived from counter 140 six pulses CR (or four pulses CD) thereafter. When the record bit in line 131 is zero, the counter 140 is preset to overflow −3 and only the three bits farthest in register 130 are decoded to determine the two data bits on lines 121.

Whenever the counter 140 reaches overflow, it produces another load strobe and feeds same to gate 141. Thus, six bit or three bit fields are decoded as the case requires, and two or four data bits leave the register 111 before another decoding step takes place. It should be mentioned that occasionally a one bit on line 131 may have another meaning; namely, it may represent one of the record bits used for recording three groups of (01) data bits. In this case, however, another one bit is found in line 132, as these particular one record bits for defining groups of (01) data bits occur always in pairs. On the other hand, the four data bit field extensions (FIG. 2b) has record patterns in which the third record bit is a one and the sixth bit is a zero. Thus, the four data bit field-six record bit field is recognized as such only for a 0 in line 132 and for a 1 in line 131, and counter 140 is preset to overflow −6 only then. For two one bits in lines 131, 132 the counter is preset to overflow −9.

The fourth line out of register 130 is shown disconnected. This is so as that line is not needed for decoding. Whenever six recorded bits define a four data bit configuration as per extension, line 131 holds a record one and the line before invariably holds a record bit zero.

Turning back for the moment to the 010101 bit combination, one can see that the system works actually on basis of mulitple extensions, because the non flux pattern (FIG. 2a) is an available pattern under the stated constraints, but undesirable when used extensively. A modified system excluding the no-reversal entirely would have only two patterns available for two bits. Using an enlarged field of six bits, 54 patterns are available for six bit field encoding (Fibonaci number minus 1). The number of patterns needed under the formula above is determined by $r = 3$; $m1 = 2$; $2^{m1} = 4$; $N1 = 2$; $N1^{r-1} = 4$; $2^{m1} - N1 = 2$; $(2^{m1} - N1)^r = 8$; therefore: $N2 (= 54) \geq 4 . 4 + 8 (= 24) +$ additional terms.

The "additional terms" are determined, for example, by the requirement that only the second or the third two-bit groups must lead to an extension beyond the 6-bit cell, and only when the first two bits been encoded by one of the two patterns. The additional terms are then 3 . 8, so that the total number of patterns needed is 48, which is less than 54.

From the foregoing, it can readily be seen that the invention can be practiced independently from the specific mode and technique for data recording and retrieval. The invention can be practiced whenever data is recorded on the basis of placing specific characteristics on or in a storage medium, and when the spacing between such placements is of digital significance. Invariably, such characteristics cannot be placed too close together before the spacing loses recognizability. The invention, particularly the illustrated implementation, is concerned with the generation of signals (record bits) that define the placement of such characteristics irrespective of the specific physical phenomenon involved for defining such characteristics. Analogously, the invention can be practiced whenever a reproduced characteristic can be presented as a pulse, spaced apart from other pulses, and the pulses are then processed in the reproduce circuitry as described and again independent from the specific physical characteristics that gave rise to the production of the reproduce pulse.

The invention is not limited to the embodiments described above but all changes and modifications thereof not constituting departures from the spirit and scope of the invention are intended to be included.

I claim:

1. In a system for recording digital data on a magnetic storage carrier by means of a transducer, and on a track at a data bit spacing D and for a read resolution R smaller than D but wherein D is not an integral multiple of R, comprising:

first means including the transducer for recording $m$ data bits in a field of particular length;

second means including the transducer for recording $2m$ data bits in a field of twice the particular length whereby boundary recording of either field is different from mid-field recordation of a field having the length for recording $2m$ data bits;

the recording as provided by the first and second means establishing less than one transition for each data bit, so that the transitions are apart by a length larger than $1/m$ of the field of particular length and positions for transitions being spaced apart, so that less than $2^m$ and $2^{2m}$ different possibilities exist for placing transitions for recording of respectively $m$ and $2m$ data bits;

third means connected to the first and second means and providing to them a train of bi-valued data bits; and fourth means connected for operating the first and second means in response to combinations of bit values of $m$ data bits, so that for a plurality of different bit value combinations, less than $2^m$, the first means is operated, and for at least one other bit value combination of the first $m$ of $2m$ data bits, $2m$ data bits are recorded in one of $2^m$ different patterns.

2. In a system as in claim 1, wherein $m$ is 2.

3. In a digital data storage and retrieval system having a movable storage carrier coacting with transducer means for recording digital data in a track on the carrier in a manner wherein the bit train width D is smaller than the minimum spacing for a particular characteristic and for retrieving the data from the track, comprising:

first means connected for receiving a train of data bits to be recorded;

second means connected to the first means for converting groups of $m$ data bits each respectively, into $n$ record bits, with $m<n$ whereby any bit of the $n$-bits as converted and having a first value, is never followed nor succeeded by a bit of the same value within the same group as well as with regard to groups following each other in immediate sequence, so that less than $2^m$ different combinations are possible with $n$ record bits, the second means constructed to provide for conversion of less than $2^m$ particular different bit combinations, $n$ and $m$ being positive integers larger than one;

third means connected to the first and second means and operating in response to particular bit value combinations of $2m$ bits of which the first $m$ are not convertible by operation of the second means for converting such $2m$ data bits into $2n$ record bits where $n<2m<2n$ whereby any bit of the $2n$ bits as converted and having the first value is never followed nor succeeded by a bit of the same value;

fourth means connected to the second and third means for deriving therefrom a train record bits;

fifth means connecting the fourth means to the transducer means for control thereof in response to said train or record bits, for placing a particular characteristics on the carrier in response to the bits of the first values of the train of record bits;

sixth means connected to the transducer means for deriving therefrom a train of reproduced record bits;

seventh means connected to the sixth means for assembling sets of $2n$ reproduced record bits;

eighth means connected to the seventh means for selectively converting $2n$ or $n$ assembled reproduced record bits, into $2m$ or $m$ data bits; and ninth means connected to the seventh means and responsive to the reproduced particular criteria to control the selective converting as to $2n$ or $n$ reproduced record bits.

4. In a system as in claim 3, the second means providing a first second bit value for the bit in the $n'$th position for encoding of $m$-data bits, and a bit of opposite value for the $n'$th position for encoding of $2m$-data bits as the particular common criterium.

5. In a digital data storage system having a movable storage carrier coacting with a transducer for recording digital data in a track on the carrier, comprising:

first means connected for receiving a train of bivalued data bits to be recorded at a particular data bit spacing D;

second means connected to the first means for converting $m$ bits into $n$ record bits wherein $n$ and $m$ are positive integers larger than one and $n>m$ whereby any bit of the $n$-bits as converted and having a first value is never followed nor succeeded by a bit of the same value within the same group as well as with regard to groups following each other in immediate sequence, record bits having said first value follow each other at a spacing which is larger than the spacing of the data bits and record bits of any value are spaced at a resolution R for retrieving the data from the carrier with $n \times R = m \times D$ so that less than $2^m$ different combination are possible with $n$-bits, the second means constructed to provide for conversion of less than $2^m$ particular different bit combinations;

third means connected to the first and second means and operating in response to particular bit value combinations of $km$ bits of which the first $m$-bits are not convertible by operation of the second means, for converting such $km$ data bits into $kn$ record bits whereby any bit of the $kn$ bits as converted and having the first value is never followed nor succeeded by a bit of the same first value and the number of possible combinations of $kn$ record bits is smaller than $2^{km}$;

circuit means connected and operated to receive record bits from the second and third means;

fourth means connected to the circuit means for deriving therefrom a continuous train of record bits at a bit rate defining the resolution of the record system and wherein consistently bits of the first value are separated by a spacing larger than the particular data bit spacing and by at least one record bit of the opposite value; and fifth means connecting the fourth means to the transducer for control thereof in response to said train of record bits, for placing particular characteristics on the carrier in response to the first bit values of the train of record bits, so that the particular characteristics as so placed are spaced-apart at distance determined by the number of bits of the opposite value in-between respective two bits of the first value.

6. In a system as in claim 5, wherein $k$ is 2 and the particular characteristics is flux reversal.

7. Apparatus for converting digital information presented in a first train of electrical signals representing bivalued bits spaced by a distance D and for a resolution R into a second train of electrical signals in which a particular characteristics recurs at a spacing less than D, comprising:

first circuit means connected to receive said first signal train and responsive to particular bit combinations respectively in sequentially appearing groups of bits in the train, each group having a fixed number of bits and converting each such group into an electrical signal pattern in which a particular signal characteristics follows another particular signal characteristics by at least a minimum distance larger than the data bit spacing D in the train of electrical signal the relative spacings between the particular characteristics being of digital significance for a bit group so encoded, the minimum distance being maintained as between the characteristics in sequential signal patterns when concatenated as corresponding to sequentially occurring bit groups encoded correspondingly sequentially, the number of patterns constituting a first plurality being less than the number of possible bit combinations in a group of bits;

second circuit means for detecting whether a group of bits of said first train having said fixed number of bits has a particular bit combination not convertible by operation of the first circuit means;

third circuit means connected to the second circuit means and responsive to the detection of said bit combination for converting signals of the train representing a group of bits having a larger number of bits than the fixed number, if the first bits of the latter group has said particular combination and is not encoded by a pattern of the first plurality, using a second longer plurality of signal patterns in which the particular characters also follow at the minimum distance, so as to convert the first bits in combination with additional bits of the larger number of bit groups;

fourth circuit means connected to the first and third conduit means for providing a continuing train of signals as the second train and being established by concatenating the signal patterns as resulting from said convertings by the first and third circuit means wherein the particular characteristics does recur at the minimum distance or less throughout the train of signals as so provided; and a transducer connected to be operated by said continuing trains of signals.

8. Apparatus for recording digital information presented in a train of electrical signals representing bivalued bits, following each other at a frame width D, comprising:

first circuit means responsive to bit combinations in groups of $m1$ bits of said electrical signal train and providing one of a first plurality of electrical signal patterns, in which a particular characteristics follows another one by at least at a minimum distance $M>D$, and in particular positions of each said patterns spaced by a distance $R<M$ and $R<D$, so that never such characteristics is found in two consecutive particular positions, the number of possible patterns being not more than $N1$, each pattern covering a plurality $n_1$ of particular positions, and for a record field length of $N1 \times R = m1 \times D$, the number of needed patterns being $2^{m1} > N1$ so that $2^{m1} - N1$ bit combinations are not encodable by any pattern of the first plurality;

second circuit means connected to be responsive to groups of $m1$ bits each for being specifically responsive to each of said $2^{m1} - N1$ particular bit value combinations in the signal train not encodable nor encoded by the first means;

third circuit means responsive to a group of $m2$ bits in the signal train wherein $m2 > m1$ and having its first $m1$ bits as one of said bit combinations not encoded by a pattern of the first plurality, and operating in response to the second means to provide a signal pattern being one of a second plurality of signal patterns wherein also the particular characteristics follows also at least at said distance distance M and in $n2$ particular positions spaced by said distance R and wherein in one of the first $n1$ of the particular positions for placement of particular characteristic as defining a pattern of the second plurality, there is a particular characteristics as part of the pattern of the second plurality, which one position is not available for placement of a particular position characteristic within any of the patterns of the first plurality;

fourth circuit means connected to the first and third means and providing a second electrical signal train which is composed of sequentially provided signal patterns of the first and second pluralities as provided by the first and third means; and transducer means connected to the fourth circuit means for reproducibly recording the second electrical signal train on a storage surface, wherein said particular characteristics as recorded on the storage surface has spacing equal to M or larger throughout the train as produced by the fourth means and as recorded, and reproduction of the recording of the particular characteristics can operate with a resolution R.

9. In a digital data storage system having a movable storage carrier coacting with a transducer for recording digital data in a track on the carrier at a data bit spacing D and for a read resolution R smaller than D and wherein D is not an integral multiple of R, comprising:

a first shift register having positions to store $2m$ data bits;

data supply means for shifting bi-valued data bits into the first register;

first, decode and re-encode circuit means connected to be responsive to the first $m$ (in time) of $2m$ data bits held in the first register and converting them into $n > m$ record bits under a condition $n \cdot R = m \cdot D$ and wherein any record bit of a first value represents placement of a flux reversal on the storage carrier and sequential record bits of the first value are spaced farther than the equivalent data bit spacing D in that any such first value record bit is not juxtaposed to bits of the first value pursuant to the conversion, the number of record bit combinations permissible being less than $2^m$ so that not all combinations $m$ bits each are convertible into $n$ record bits;

the next $m$ bits are presented in the same positions of the first register for decoding $m$ bits later, $n$ and $m$ being positive integers;

second circuit means responsive to a particular combination of $m$ bits in the first register which are not decoded and re-encoded into $n$ record bits and causing all of the $2m$ bits to be converted by the first means into $2n$ record bits;

a second register connected to the first and second circuit means to receive therefrom $n$ or $2n$ bits in dependence upon operation of the first and second circuit means; and third circuit means to shifting the content of the second register out of the second register and applying the record bits sequentially to the transducer so that record bits of the first value produce a flux reversal in the track and sequential flux reversals are always spaced farther than the equivalent data bit spacing of the data as so recorded.

10. In a digital data storage system as in claim 9, wherein $m$ is 2 and $n$ is 3.

11. In a digital storage system having a movable storage carrier coacting with a transducer for recording digital data in a track at a data bit spacing D and for a read resolution R smaller than D and wherein D is not an integral multiple of R, comprising:

a first shift register having position to store $2m$ bi-valued data bits;

a second shift register having positions to store $2n$ bi-valued record bits, with $n>m$, $n$ and $m$ being positive integers larger than one and $D \times m = n \times R$;

a decoder interconnecting the first and second registers to convert bits held in the first register into bits to be stored in the second register and any bit of a particular value in the second register represents placement of a flux reversal on the storage carrier, and sequential record bits of the first value are spaced farther than the equivalent data bit spacing D in that any such first value record bit has bits of opposite values in preceding and succeeding bit positions, the decoder constructed not to convert at least one particular combination of $m$ bits respectively in $m$ stages in the register for reasons of absence of an available combination of record bit values;

first control means responsive to absence of at least one particular combination of values of the bits in $m$ stages in the first register to operate the decoder for setting $n$ record bits into the second register;

second control means responsive to a particular combination of bits in the first register to operate the decoder for setting $2n$ record bits into the second register; and third control means responsive to operation of the first and second control means to control timing of the first and second control means in response to the respective last one of them to respond and respectively $m$ or $2m$ data pulses later.

12. In a system of recording digital information on a magnetic surface by means of a transducer magnetizing the surface along a track in different directions; there being transitions in-between adjacent track portions that have been magnetized in different directions, the system including a control circuit for the transducer producing particular pulses for controlling the placement of the transitions, the improvement comprising:

first means connected to be responsive to a train of data bits for stepwise and selectively converting a first and a second plurality of bi-valued data bits respectively into a first and a second plurality of bi-valued record bits at a bit rate defining the resolution of recording the data bit spacing being not integrally related to said resolution, the first pluralities being respectively larger than the second pluralities and the first and second pluralities of data bits being respectively smaller than the first and second pluralities of record bits to produce a train of record bits in which any two bits of a first value in the resulting train of record bits are spaced apart further than a single data bit frame is wide and are separated by at least one bit of the opposite value in the second plurality, so that for the resolution of recording as defined by the record bits spacing, the numbers of possible record bit combinations respectively of the first and second plurality are smaller than the respective number of data bit value combinations for numbers of data bits respectively equal to the first and second plurality;

second means connected to control the selective converting in response to detection of specific bit value combinations of the data bits of the second plurality; and circuit means connected to the first means and providing pulses to cause the transducer to place a single transition on the magnetic surface for each record bit of the particular value and no transition for each second bit of said opposite value, the smallest spacing between sequential transitions being larger than the spacing between sequential data bits as so recorded.

13. A digital data storage system having a movable storage carrier connecting with transducer means for recording digital data in a track on the carrier whereby the width D of the digital data bit spacing is smaller than the minimum spacing for a particular characteristic, comprising:

first means connected for receiving a train of data bits to be recorded;

second means connected to the first means for converting groups of $m$ data bits each respectively, into n record bits, with $m<n$ whereby any bit of the $n$-bits as converted and having a first value, is never followed nor succeeded by a bit of the same value within the same group as well as with regard to groups following each other in immediate sequence, so that less than $2^m$ different combinations are possible with $n$ record bits, the second means constructed to provide for conversion of less than $2^m$ particular different bit combinations, $n$ and $m$ being positive integers larger than one;

third means connected to the first and second means and operating in response to particular bit value combinations of $2m$ bits of which the first $m$ are not convertible by operation of the second means for converting such $2m$ data bits into $2n$ record bits where $n<2$ $m<2$ $n$ whereby any bit of the $2n$ bits as converted and having the first value is never followed nor succeeded by a bit of the same value;

fourth means connected to the second and third means for deriving therefrom a train record bits; and fifth means connecting the fourth means to the transducer means for control thereof in response to said train or record bits, for placing a particular characteristic on the carrier in response to each of the record bits of the first value.

14. A storage system as in claim 13 wherein the carrier has a magnetizable surface magnetized by the transducer means, the particular characteristics being flux reversal.

15. A storage system as in claim 13, wherein $n$ is 3 and $m$ is 2.

16. In a system for recording digital data on a movable magnetic storage surface by means of a transducer and wherein the recorded transitions are placed farther than the data bit frame width D, comprising:

record clock means providing record clock signals at a rate corresponding to the read resolution R for retrieval of recorded data;

a register for holding bi-valued record bits and for being shifted serially out of the register at the rate of the record clock signals;

circuit means connecting the register to the transducer to control the transducer in response to the record bits as shifted out of the register and in further response to the clock signals;

whereby a record bit of a first value as shifted out of the register controls a flux reversal in response to a clock signal, while a record bit of the opposite value does not control a flux reversal;

decode means providing decoded signals as record bits to the register so that no two record bits of the first value will follow in immediate sequence when shifted out, but each record bit of the first value will be preceded and succeeded by a record bit of the opposite value and record bits of the first value are spaced by a distance larger than the data bit frame width, and including less than $m$ bits of the first value among $n$ record bits for a relation $n \times R = m \times D$, wherein D is not an integral multiple of R so that less than $2^m$ different combinations of record bits are available;

data means for providing bi-valued data bits as input signals to the decode means;

first control means operating in response to either of a first particular plurality of bit value combinations of $m$ data bits for causing the decode means to provide $n$ record bits to the register, $n$ being larger than $m$, $n$ and $m$ being positive integers;

second control means operating in response to at least one other bit value combination for causing more than $m$ bits to be decoded by the decode means thereby providing a number of record bits larger than $n$ to the register; and timing means for control of the first and second control means as to timing of response in dependence upon which of the first and second control means had operated last, so that after $n$ bits have been set into the register, $n$ record clock signals are provided for shifting the $n$ bits in the register and after more than $n$ bits have been set into the register more than $n$ record clock signals are provided for shifting the more than $n$ bits prior to providing near record bits into the register.

17. In a system as in claim 16, wherein $m$ is 2 and $n$ is 3 and wherein the more than $m$ bits are 4 bits.

18. Apparatus for producing an electrical signal train in representation of a stream of bi-valued data bits spaced by a distance D but under the constraint, that a particular characteristic in the train to be produced is spaced not closer than a spacing M being larger than D, comprising:

first means for receiving the stream of bi-valued bits as signals of a first train;

second means connected to the first means for converting electrically groups of the signals of the first train and representing $m_1$ bi-valued bits each, into an electrical signal pattern, in which the particular characteristics within such a pattern as well as in any two concatenated patterns follow at least at the minimum distance M, and wherein the resolution R for placement of the particular characteristic is not integrally related to said distance D, so that the number of possible patterns as provided by the second means in response to different bit value combinations being $N_1$, the number of needed patterns being $2^{m_1} > N_1$ so that $2^{m_1} - N_1$ bit combinations are not convertible and are not being converted by the second means;

third means connected to the first means for detecting electrically groups of $m_1$ bits each in the bit stream of said first train and herein the occurrence of specific $m_1$ data bits in the stream not convertible by operation of the second means;

fourth means connected to the third means to be responsive to the detection of said occurrence, and further connected to the first means for converting electrically a group of signals of the first train and representing $m_2$ bi-valued bits, $m_2 > m_1$, in response to the detection of $m_1$ first bits of a bit combination as not encoded by the second means into an electrical signal pattern, wherein being larger than any of the patterns provided by the second means and the particular characteristics follow at least at said distance M, there being $N_2$ patterns available with $N_2 < 2^{m_2}$, the numbers $m1, m2, N1, N2$ being positive integers;

the number $2^{m_2} - N2$ being not larger than the number of bit value combinations for $m2$ bits which include $m1$ consecutive bits following the first $m1$ bits of the $m2$ bit group, and having a bit value combination not encoded by one of the N1 patterns, while the first $m1$ bits are convertible in one of the N1 patterns; and fifth means connected to the second means and to the fourth means for generating an electrical signal train by concatenating the electrical signals as produced by the second and fourth means and as representing said patterns as resulting from sequential converting of the data bits, and wherein the representation of the particular characteristics recurs at said minimum distance or less frequently within each pattern as well as from pattern to pattern for the rate of flow of data bits as transmitted and produced therewith.

19. Apparatus as in claim 18 wherein the read resolution R for retrieval of encoded data and the spacing D between the bits of the train are related by the ratio of two integral numbers, the ratio being larger than 0.5, $n \cdot R = m \cdot D, m < n < 2m$.

20. Apparatus for recording digital data represented by a stream of bi-valued data bits spaced by a distance D, comprising:

first circuit means for receiving the stream of bi-valued bits as signals of a first train;

second circuit means connected to the first means for converting electrically groups of the signals of the first train and representing $m_1$ bi-valued bits each, into an electrical signal pattern, in which the particular characteristics within such a pattern as well as in any two concatenated patterns follow at least at a minimum distance M being not smaller than D, and where the resolution R for placement of the particular characteristic is not integrally related to said distance D, so that the number of possible patterns as provided by the second means in response to different value combinations of said $m_1$ bits being $N_1$, the number of needed patterns being $2^{m_1} > N_1$ so that $2^{m_1} - N_1$ bit combinations are not convertible and are not being converted by the operation of the second means;

third circuit means connected to the first means for detecting electrically groups of $m_1$ bits each in the bit stream of said first train and herein the occurrence of specific $m_1$ data bits in the stream not convertible to a pattern by the operation of the second means;

fourth circuit means connected to the third means to be responsive to the detection of said occurrence, and further connected to the first means for converting electrically a group of signals of the first train and representing $m_2$ bi-valued bits, $m_2 > m_1$, in response to the detection of $m_1$ first bits of a bit combination as not encoded by the second means, into an electrical signal pattern being larger than any of the patterns provided by the second means and wherein also the particular characteristics follow at least at said distance M, there being $N_2$ patterns available for encoding $m_2$ bits; the numbers $m1$, $m2$, $N1$, $N2$ being positive integers, the number $N_2$ being smaller than $2^{m_2}$ but the $N_2$ patterns including the $N_1$ patterns as portions, the number $2^{m_2} - N2$ being not larger than the number of bit value combinations for $m2$ bits which include $m1$ consecutive bits following the first $m1$ bits of the $m2$ bit group, and having a bit value combination not encoded by one of the N1 patterns, while the first $m1$ bits are convertible in one of the N1 patterns.

fifth circuit means connected to the second and fourth means and providing a second electrical signal train which is composed of sequentially provided signal patterns of the first and second pluralities as provided by the first and third means; and transducer means connected to the fifth circuit means for reproducibly recording the second electrical signal train on a storage surface, wherein said particular characteristics as recorded on the storage surface has spacing equal to M or larger throughout the train as produced by the fourth means and as recorded, and reproduction of the recording of the particular characteristics can operate with a resolution R.

* * * * *